United States Patent
Niewels (10) Patent No.: US 7,156,651 B2
(45) Date of Patent: Jan. 2, 2007

(54) APPARATUS FOR INJECTION MOLDING ARTICLES

(75) Inventor: Joachim J. Niewels, Thornton (CA)

(73) Assignee: Husky Injection Molding Systems Ltd. (CA)

( * ) Notice: Subject to any disclaimer, the term of this patent is extended or adjusted under 35 U.S.C. 154(b) by 406 days.

(21) Appl. No.: 10/847,854

(22) Filed: May 19, 2004

(65) Prior Publication Data

US 2004/0208949 A1    Oct. 21, 2004

Related U.S. Application Data (63) Continuation-in-part of application No. 10/670,870, filed on Sep. 25, 2003, now Pat. No. 7,037,103, which is a continuation-in-part of application No. 09/900,083, filed on Jul. 6, 2001, now abandoned.

(51) Int. Cl.
  *B29C 45/23* (2006.01)
(52) U.S. Cl. ..................... 425/564; 264/328.9
(58) Field of Classification Search ............... 425/562, 425/563, 564, 565, 566; 264/328.9
  See application file for complete search history.

(56) References Cited

U.S. PATENT DOCUMENTS

| | | | |
|---|---|---|---|
| 4,256,584 A | 3/1981 | Lord et al. | |
| 4,286,941 A | 9/1981 | Gellert | |
| 4,712,995 A | 12/1987 | Basnett | |
| 5,505,613 A | 4/1996 | Krummenacher | |
| 5,902,614 A | 5/1999 | Kuntz | |
| 6,135,757 A | 10/2000 | Jenko | |
| 6,220,850 B1 | 4/2001 | Catoen et al. | |
| 6,921,259 B1 * | 7/2005 | Sicilia et al. | 425/562 |
| 7,037,103 B1 * | 5/2006 | Niewels | 425/564 |
| 2003/0170340 A1 | 9/2003 | Sicilia et al. | |

FOREIGN PATENT DOCUMENTS

| | | |
|---|---|---|
| CA | 2175634 | 11/1997 |
| EP | 0 638 407 B1 | 2/1995 |

\* cited by examiner

*Primary Examiner*—Tim Heitbrink
(74) *Attorney, Agent, or Firm*—Katten Muchin Rosenman LLP (57) ABSTRACT

An improved injection molding apparatus having a valve-gated injection nozzle for regulating a flow of molten material through a connecting passageway to a mold cavity. An end portion of the valve stem is configured to cooperate with a complementary sealing portion of the connecting passageway, when the valve stem is configured in a closed position. The mold cavity further includes a vestige forming portion that is located adjacent the sealing portion that is partially defined by a bottom portion of the valve stem when it is configured in the closed position. The apparatus is characterized in that the vestige forming portion extends radially outwardly from the sealing portion such that a first cross-sectional area of the sealing portion is smaller than a second cross-sectional area of the vestige forming portion. Accordingly, tearing along the vestige of the part is substantially avoided.

32 Claims, 10 Drawing Sheets

APPARATUS FOR INJECTION MOLDING ARTICLES

CROSS-REFERENCE TO RELATED APPLICATIONS

This application is a continuation-in-part of an application entitled "Improved Apparatus for Injection Molding Articles", application Ser. No. 10/670,870 filed Sep. 25, 2003 now U.S. Pat. No. 7,037,103, which is itself a continuation-in-part of an application entitled "Method and Apparatus for Injection Molding Articles", application Ser. No. 09/900,083 filed Jul. 6, 2001 now abandoned, and are incorporated herein by reference.

BACKGROUND OF THE INVENTION

1. Field of the Invention

This invention relates to injection molding systems. More specifically, the present invention relates to a valve gating system found in injection molding systems.

2. Summary of the Prior Art

Injection molding nozzles are well known and are used to inject materials, such as plastic, into cavities of a mold. For example, such nozzles receive molten material, such as plastic, from an injection molding machine and direct the same into mold cavities through passages called gates. When an injection operation is complete, and prior to opening the mold cavity to eject the molded parts, the transfer of molten material through the gates must be stopped. Generally, two methods exist for stopping the transfer of molten material through the gates, namely: thermal, or open, gating; and valve gating.

In thermal gating, the gate is an open aperture through which molten material passes during an injection operation. The gate is rapidly cooled at the end of the injection portion of the cycle, when the injection pressure is removed, to "freeze" the injected material into a plug. This plug remains in the gate to prevent drool of molten material from the gate when the mold is open for the ejection of the molded part. In the next injection portion of the cycle, the cooling applied to the gate is effectively removed and hot molten material from the injection molding machine pushes the remaining plug into the mold cavity, where it melts and mixes with the newly provided molten material.

In valve gating, the opening and closing of the gate is independent of injection pressure and/or cooling and is achieved mechanically with a valve stem. This stem can be moved between an open position, wherein flow of molten materials through the gate is permitted, and a closed position wherein the gate is closed by entry of the valve stem into the gate which establishes a seal, preventing molten materials from passing through the gate. Valve gating is well known and examples of such systems are shown in U.S. Pat. Nos. 2,878,515; 3,023,458; and 3,530,539, each being incorporated herein by reference.

Generally, for situations that require improved aesthetics, valve gating is preferable to thermal gating because it can reduce the undesired gate vestige which results on the finished molded part. However, there are problems with valve gating systems.

Specifically, the valve stem and gate each have mating sealing portions with a typical diametrical clearance of 0.001 to 0.002 inch between the valve stem and the gate sealing portions. As the valve stem is moved into alignment with the sealing portion of the gate to effect sealing, a slight misalignment of the stem with the gate will cause the stem to strike the gate sealing portion. Over time, this will cause the gate area to wear and become misshapen. Once the gate sealing area is worn, the stem no longer stops the flow of molten material and a small amount of molten material will migrate between the stem and the worn gate sealing area. This leakage adversely impacts the vestige quality because as the mold is opened, the now-solidified material between the gate and the valve stem will cause a tear or blemish to form along a side of the vestige of the part, and in extreme cases, the tearing can propagate to the surface of the molded article or preform (this phenomenon is commonly known as 'gate tearing').

Following the injection cycle, typically the mold halves will open and the molded article in a somewhat solidified state will be removed from the stem/gate area. Due to the entrapped molten material between the worn gate area and the stem, the molded article will not break away cleanly when the mold is opened, but rather will tear away from the gate area, which results in a blemished vestige on the molded article.

Figure 1A:
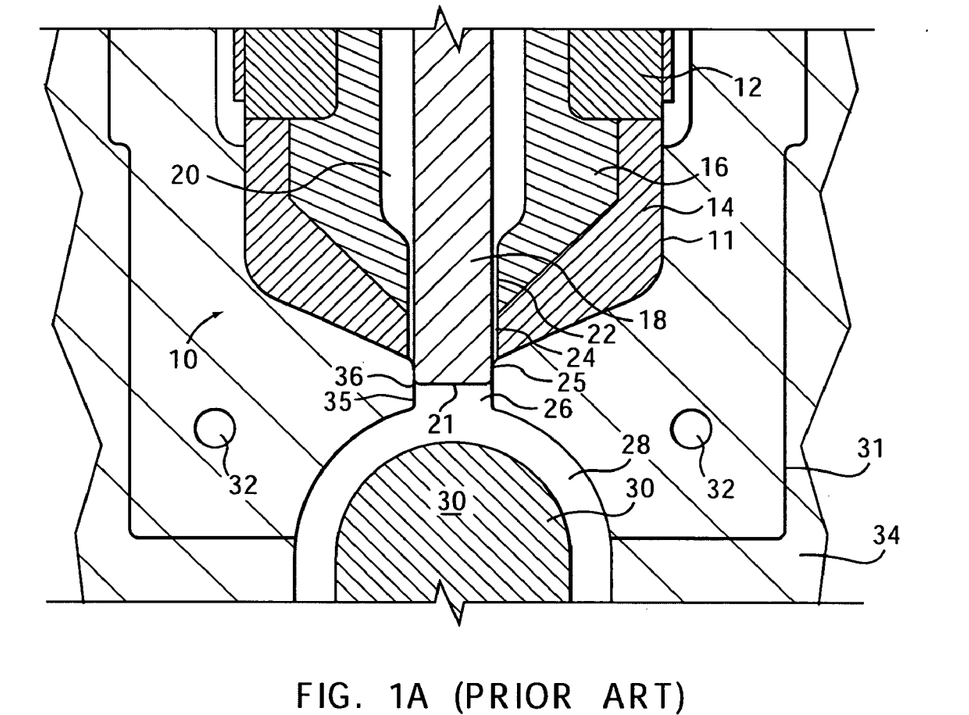
FIG. 1A is a simplified cross-sectional view of an injection molding nozzle and gate insert in accordance with the prior art.
Figure 2:
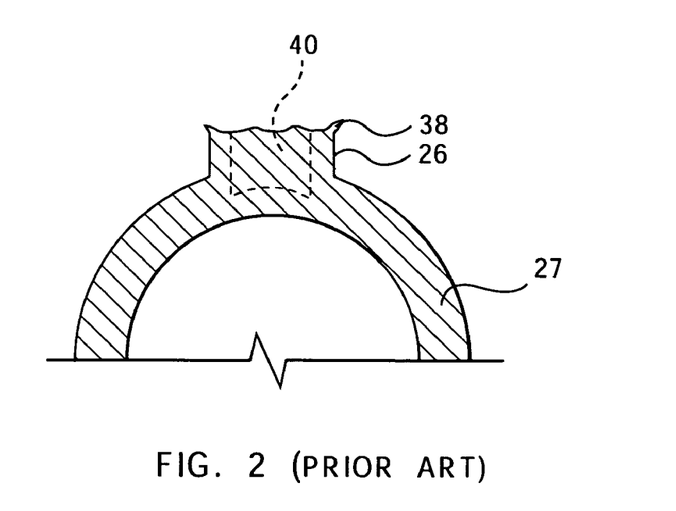
FIG. 2 is a partial cross-sectional view of a molded article in accordance with the prior art.

Referring to FIGS. 1A and 2 this phenomenon can be related. As well known in the art, a nozzle assembly 10 is comprised of an elongated nozzle bushing 12 with a nozzle tip 16 affixed co-axially therein. Optionally, an insulator 14 is affixed to a proximal end of the nozzle tip 16 thereby thermally insulating the heated nozzle assembly 10 from a cooled gate insert 31 and cavity insert 34. A movable valve stem 18 extends co-axially in the nozzle assembly 10 and is selectably positioned in or out of a passageway 22 in the nozzle. A melt channel 20 surrounds the valve stem 18 and runs the length of the nozzle assembly 10 to communicate a molten material to a mold cavity 28. When the valve stem 18 is placed in a fully closed position (as shown in FIG. 1A), valve stem 18 extends into a gate sealing portion 25 in the gate insert 31. The sealing portion 25 sealingly surrounds the valve stem 18 to shut off the flow of material to the mold cavity 28. As shown in FIG. 1A, a face portion 21 of valve stem 18 and a vestige forming portion 35 of the gate insert 31 define the entire top and side of the molded article vestige 26. A chamfer 36 is typically provided along the face of the valve stem 18 to help guide the valve stem into the sealing portion 25 of gate insert 31 and reduce wear of the valve stem and gate inset 31.

Due to the close fit of the valve stem 18 to the sealing portion 25, any misalignment that exists between their respective interfaces will cause the valve stem 18 to strike the surface of the sealing portion 25 which will ultimately lead to a deterioration of the sealing portion 25 and/or the valve stem 18. Gate insert 31 provides a component that can be replaced as the sealing portion 25 wears rather than replacing the entire cavity insert or plate if the sealing portion 25 and the recess 11 for receiving nozzle assembly 10 were formed directly therein, as may still be done with smaller number of cavities. However, gate insert 31 still is a fairly detailed component and it is undesirable to replace it unless absolutely necessary.

At the end of the injection cycle, the valve stem 18 is moved into its closed position as previously described and the molding inserts, including core 30, are held in a closed position for a predetermined cycle time to allow the molten material to cool and solidify, thereby forming the molded article. Once the molded article has been allowed to cool to a sufficient level, the core 30 with the molded article thereon is moved away form the gate insert 31 and the vestige 26 is pulled away from the face portion 21 of the valve stem 18. If enough wear exists between the valve stem 18 and the sealing portion 25, a small amount of molten material will have migrated therein, and consequently as the vestige 26 is moved away form the vestige forming portion 25 a peeled edge 38 may also form on the vestige 26 of the molded article 27.

Also, since the valve stem 18 is surrounded by molten material, it becomes quite hot. When the gate is closed by the valve stem 18, the hot tip of the valve stem 18 cools slower than the gate insert 31 as the mold cavity 28 is cooled. Ideally, molded article 27 is not removed form the mold until the vestige 26 has cooled sufficiently to allow a clean separation of the solidified material at the face portion 21 of the valve stem 18. With the valve stem being hot compared to the gate insert, this can require increased cycle times to permit the necessary cooling and/or can result in undesirable characteristics in the molded article 27. Specifically, as the material in the mold cavity 28 adjacent the valve stem 18 is cooled relatively slowly due to the hot valve stem 18, parts molded from thermally sensitive materials, such as PET, can suffer from an enlarged area of crystallinity 40 or other undesired characteristics. To reduce cycle times, a mold may be opened before the material adjacent the face portion 21 has sufficiently solidified. Since the entire top surface of the vestige 26 is in contact with the face portion 21 of the hot valve stem 18, stringing and an uneven edge may form when the mold is opened.

Figure 1B:
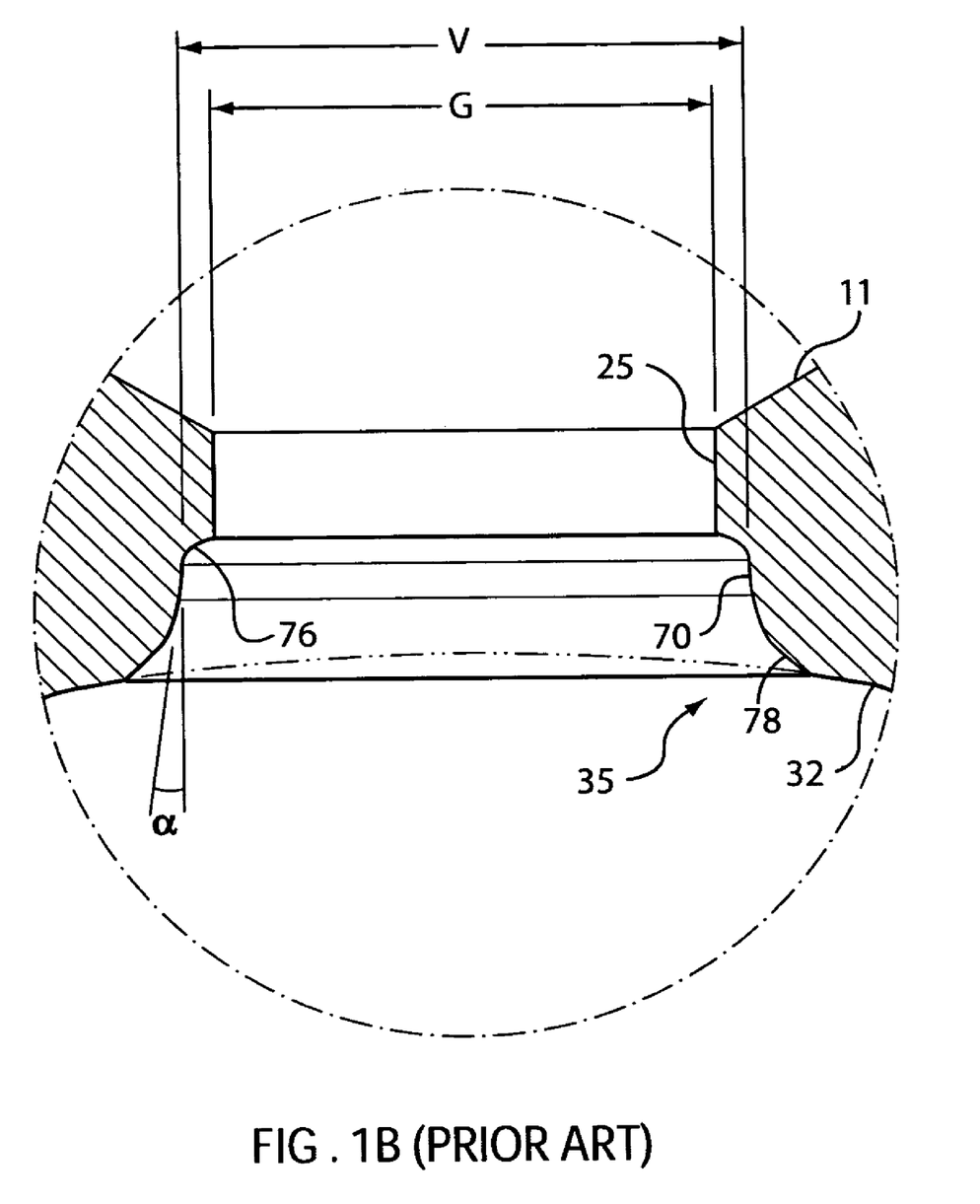
FIG. 1B is an enlarged view of the gate area of the gate insert of FIG. 1A that includes an alternative vestige forming portion in accordance with the prior art.

Referring to FIG. 1B, the gate area of the gate insert 31 of FIG. 1A is shown to include an alternative configuration of the vestige forming portion 35 that is known to have had limited use in the early 1990s in mold cavities that were configured for forming thick-walled preforms that are used in the production of refillable bottles. The alternative vestige forming portion 35 is thought to have been useful in improving the filling of the mold cavity.

As before, the vestige forming portion 35 is shown to comprise a top, a side, and a transition portion. In addition, the vestige forming portion 35 has also been configured to extend radially outwardly from the sealing portion 25 such that a first cross-sectional area, G, of the sealing portion 25 is smaller than a second cross-sectional area, V, of the vestige forming portion 35.

The top portion comprises a radial portion 76 and the face portion 21 (FIG. 1A) of the valve stem 18, when the valve stem is in the closed position. The side portion 70 comprises a frusto-conical portion that is outwardly diverging, relative to the sealing portion 25, by an angle, α. The transition portion is configured as an outwardly diverging radial portion 78 that gradually blends the vestige forming portion 35 into the adjacent molding surface portion 32 of the mold cavity 28. The ratio of the cross-sectional areas of the vestige forming portion, V, to the cross-sectional area of the sealing portion 25, is not known to have been configured in excess of about 13 percent (%), as depicted. The angle, α, of the side portion are known to be inclined at an angle of 10 degrees (°).

Therefore, there is a need for an improved valve gate system that reduces or obviates some or all of the drawbacks of the prior art.

SUMMARY OF THE INVENTION

In accordance with a first aspect of the present invention, an improved apparatus is provided that is configured for forming injection molded articles that include a vestige portion on an end thereof. The vestige portion includes a side and a top. The apparatus includes a mold with a mold cavity defined therein, and a valve-gate injection nozzle assembly. A moveable valve member is provided in the nozzle assembly for regulating a flow of molten material through the connecting passageway to the mold cavity. The apparatus further includes a connecting passageway configured in the mold between the nozzle assembly and the mold cavity with a sealing portion configured along at least a forward portion thereof. The sealing portion is configured to cooperate, in use, with an end portion of the valve member in a closed position. The apparatus further includes a vestige forming portion configured in the mold, as a portion of the mold cavity, adjacent the connecting passageway. The vestige forming portion includes a side and a top portion, that correspond to the side and top of the vestige respectively. A central portion of the top portion being provided by a bottom portion of the valve member in the closed position. The vestige forming portion is configured to extend radially outwardly from the sealing portion such that a first cross-sectional area of the sealing portion is smaller than a second cross-sectional area of the vestige forming portion, wherein, in use, on ejection of the molded article from the molding cavity, tearing along the side of the vestige portion of the molded article is substantially avoided.

In accordance with a second aspect of the present invention, a gate insert provided that is configured to cooperate with at least one other molding insert in an injection mold for forming injection molded articles that include a vestige portion on an end thereof. The vestige portion includes a side and a top. The gate insert further includes a nozzle seat for receiving a valve-gate injection nozzle assembly that is configured along the surface of a recess formed through a top surface of a gate insert body. The gate insert further includes a molding cavity portion that is configured along the surface of an opening formed through a bottom surface of the gate insert body. The gate insert further includes a connecting passageway configured between the nozzle seat and the molding cavity portion with a sealing portion configured along at least a forward portion thereof that is configured to cooperate, in use, with an end portion of a valve member of the nozzle assembly in a closed position. The gate insert further includes a vestige forming portion configured in the gate insert body between the connecting passageway and the molding cavity portion. The vestige forming portion having a side and a top portion, that correspond to the side and top of the vestige respectively. A central portion of the top of the vestige forming portion is provided, in use, by a bottom portion of the valve member in the closed position. The vestige forming portion is configured to extend radially outwardly from the sealing portion such that a first cross-sectional area of the sealing portion is smaller than a second cross-sectional area of the vestige forming portion, wherein, in use, on ejection of the molded article from the molding cavity, tearing along the side of the vestige portion of the molded article is substantially avoided.

Preferably, the connecting passageway and the vestige forming portion are provided along a first and a second cylindrical bore, respectively, that are both concentrically configured through a central portion of the gate insert. An annular portion is configured therebetween that defines a portion of the top portion of the vestige forming portion.

Preferably, the cross-sectional area of the vestige forming portion is configured to be at least 17 percent (%) greater than the cross-sectional area of the sealing portion.

Preferably, the top and side portions of the vestige forming portion are substantially perpendicular.

Preferably, the bottom portion of the valve member is coplanar with the annular portion of the vestige forming portion when the valve member is in the closed position.

Preferably, a minimal radial portion is configured in a corner between the side and top portions of the vestige portion.

Preferably, a corner between the annular portion and the gate sealing portion is configured to be substantially sharp.

Preferably, the vestige forming portion further includes a transition portion that is configured to gradually blend the vestige forming portion into the remainder of the molding cavity.

Alternatively, the connecting passageway and the vestige forming portion may be configured in a replaceable insert that is itself configured for installation in the gate insert or in a cavity plate.

Alternatively, the connecting passageway includes an alignment portion that is configured between the nozzle assembly and the gate sealing portion for aligning the end portion of the valve stem with the gate sealing portion.

Alternatively, a melt backflow feature is configured adjacent the end portion of the valve stem.

Alternatively, the connecting passageway is configured to include a melt backflow feature between the gate sealing portion and the nozzle assembly.

Alternatively, the bottom portion of the valve member may be further forward or behind the annular portion of the vestige forming portion when the valve member is in the closed position.

DETAILED DESCRIPTION OF THE PREFERRED EMBODIMENTS

Figure 3:
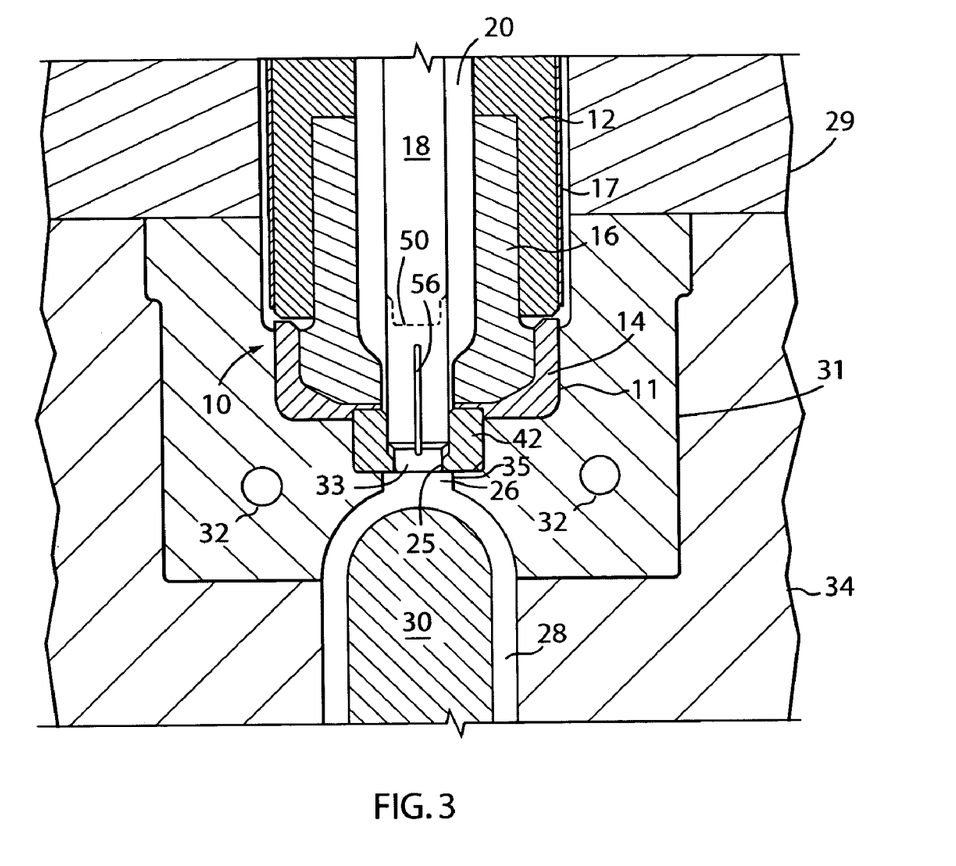
FIG. 3 is a simplified cross-sectional view of an embodiment of the present invention.

Referring now to FIG. 3, an injection molding nozzle assembly 10 in accordance with an embodiment of the present invention is shown installed in an injection mold. Accordingly, the nozzle assembly 10 extends through a hot runner manifold plate 29 and is seated within a recess 11 of a gate insert 31. The gate insert 31 is located within a cavity insert 34. In operation, a mold cavity 28 is formed between the respective molding inserts of a first half of the mold, including the gate insert 31 and cavity insert 34, engaged with those of a complementary second mold half, including a core insert 30. Thereafter, a flow of molten material is provided though the nozzle assembly 10 to the mold cavity 28 for the formation of a molded article therein. Cooling passageways 32 are provided in cavity insert 34 and gate insert 31 for the communication of a cooling fluid to remove heat from the cavity insert and gate insert to cool and solidify the molten material in the mold cavity 28.

The nozzle assembly 10, as well known in the art, is comprised of an elongated nozzle body 12 with a nozzle tip 16 affixed to a proximal end of the nozzle body. In a preferred embodiment, the nozzle tip 16 is threaded to the nozzle body 12, but any such suitable means could be used. Typically, a heater 17 is installed on the outside of nozzle assembly 10 to maintain the molten material in a molten state. Preferably, an optional insulator 14 is located between the nozzle tip 16 and the cooled gate insert 31 to reduce the transfer of heat from the hot nozzle tip 16 to the cooled gate insert 31. Located co-axially in the nozzle assembly 10 is a movable valve stem 18 that extends adjacent a vestige forming portion 35 of the mold cavity 28. Preferably, the valve stem 18 is a slender elongated cylindrical piece that is moved up and down to an open and closed position respectively. When the valve stem 18 is in the open position as shown by phantom line 50, the molten material in melt channel 20 is allowed to enter the mold cavity 28. When placed in the closed position, as shown in FIG. 3, the end portion 33 of valve stem 18 is received in a sealing portion 25 of gate insert 31 thereby stopping the flow of material to the mold cavity 28.

Sealing portion 25 is preferably located in a replaceable insert 42 that is installed in the gate insert 31 in alignment with the valve stem 18. The replaceable insert 42 can easily be replaced when leakage around the end portion 33 of valve stem 18 becomes excessive. It is, therefore, not necessary to replace the entire gate insert 31 as is done with prior art molds. Preferably, the sealing portion 25 has a smaller diameter than vestige forming portion 35, which allows for easy removal of replaceable insert 42 using a tool inserted through mold cavity 28.

Figure 4:
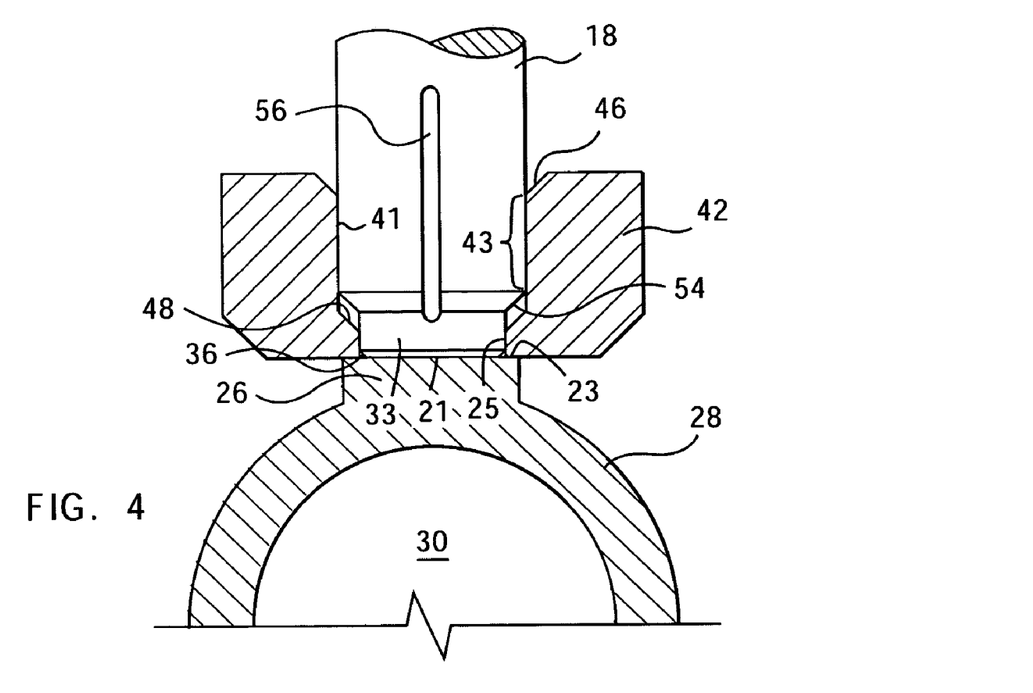
FIG. 4 is a detailed view of a portion of the view of FIG. 3.

Referring also to FIG. 4, the replaceable insert 42 also provides for more rapid cooling of an outer circumferential portion 23 of the vestige 26. Since the replaceable insert 42 is installed in the cooled gate insert 31, the circumferential portion 23 of vestige 26 adjacent the replaceable insert 42 will cool faster than the remainder of vestige 26 since the remainder is in contact with a face portion 21 of the valve stem 18, which is hotter than replaceable insert 42. This differential cooling will allow circumferential portion 23 to solidify before the remainder of vestige 26. Therefore, when core 30 is retracted to remove the molded article from the mold cavity 28, this earlier-solidified circumferential portion 23 will tend to break away more cleanly than if it had been cooled at the same rate as the remainder of vestige 26.

Figure 5:
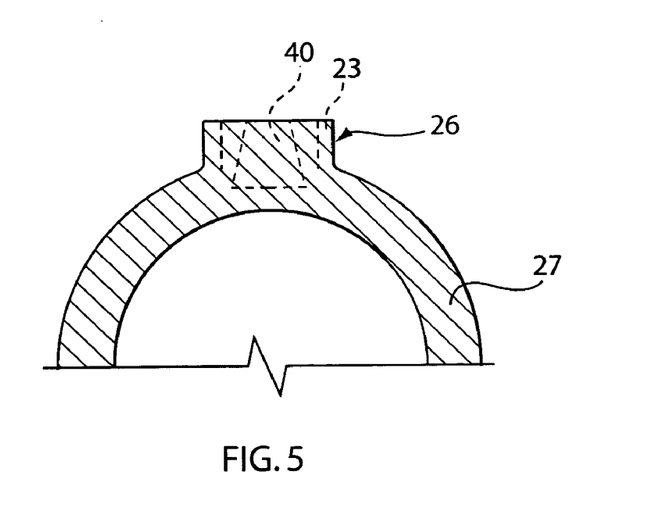
FIG. 5 is a partial cross-sectional view of a molded article in accordance with the present invention.

As shown in FIG. 5, this clean break will result in a more uniform and flat vestige 26 than with prior art molds. In addition, the area of crystallinity 40 formed inside the molded article 27 is reduced due to the improved cooling of the vestige 26. Furthermore, due to the location of the sealing portion 25 being radially offset from the outer surface of the finished vestige 26, any material weeping past seal portion 25 and solidifying is not likely to cause a tear extending to the surface of the vestige 26 when the mold is opened.

Referring again to FIGS. 3 and 4, the replaceable insert 42 has a bore 41 which receives valve stem 18. The bore 41 has a first portion and a second portion. The first portion is preferably an alignment portion 43 and the second portion is the sealing portion 25. Preferably, the sealing portion 25 has a diameter smaller than the diameter of the alignment portion 43, and the end portion 33 of valve stem 18, which is received in sealing portion 25, has a smaller diameter than alignment portion 43. This arrangement prevents end portion 33 from bumping chamfer 46 as valve stem 18 enters replaceable insert 42. Valve stem 18 preferably has a chamfer 54 above end portion 33 that interacts with chamfer 46 to help guide the valve stem 18 when it first enters the bore 41. Alignment portion 43 preferably has a close fit with valve stem 18 so that end portion 33 is received in sealing portion 25 centered and without contact. A second chamfer 48 may be provided on the replaceable insert 42 to interact with chamfer 36 on end portion 33 to help guide valve stem 18 into the sealing portion 25 if the fit between the valve stem 18 and alignment portion 43 becomes loose. These chamfers act to reduce wear on both the valve stem 18 and the replaceable insert 42 and prolong the useable life of both components.

Therefore, until substantial wear occurs between the valve stem 18 and the bore 41, there will be little wear between the end portion 33 and sealing portion 25, thereby facilitating formation of good vestiges on molded parts. Separating the alignment function and the sealing function on the valve stem 18 and replaceable insert 42 into two different portions substantially increases the life of the end portion 33 and sealing portion 25.

At least one elongated recess 56 is preferably formed in the surface of the valve stem 18. The elongated recess is preferably aligned with the valve stem 18. The elongated recess 56 functions to allow passage of molten material that would have otherwise have been trapped between the valve stem 18 and the alignment portion 43 to flow back along the elongate recess 56 and into the melt channel 20 as the valve stem is brought to the closed position and end portion 33 engages seal portion 25.

Figure 6:
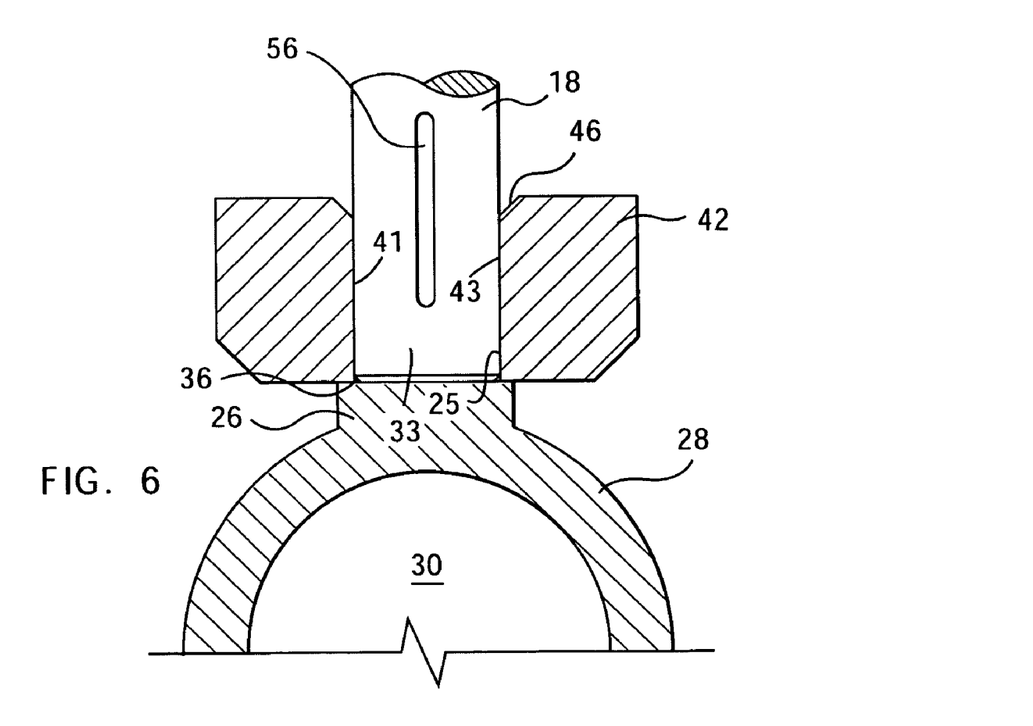
FIG. 6 is the view of FIG. 4 illustrating another embodiment of the present invention.

Referring to FIG. 6, in another embodiment of the present invention bore 41 has a uniform diameter that receives valve stem 18 in a close fit. The valve stem 18 also preferably has a uniform diameter where it interfaces with bore 41. Chamfers 46 and 36 help guide valve stem 18 into bore 41. The recess 56 again allows the molten material to flow up out of bore 41 as the valve stem 18 is brought to a closed position. This embodiment is simpler to manufacture than the embodiment shown in FIGS. 3 and 4, however with the sealing function and alignment function occurring along the same portion of the replaceable insert 42, wear of the end 33 of valve stem 18 may occur faster than with the previous embodiment. That is counteracted by the longer length of bore 41. Even if material weeps past end 33 and solidifies, for reasons discussed above it is not likely to cause a tear extending to the surface of the vestige 26 when the mold is opened.

Because replaceable insert 42 is easily removed from the gate insert 31, it can cost-effectively be readily replaced along with the valve stem 18 when wear becomes excessive.

Figure 7:
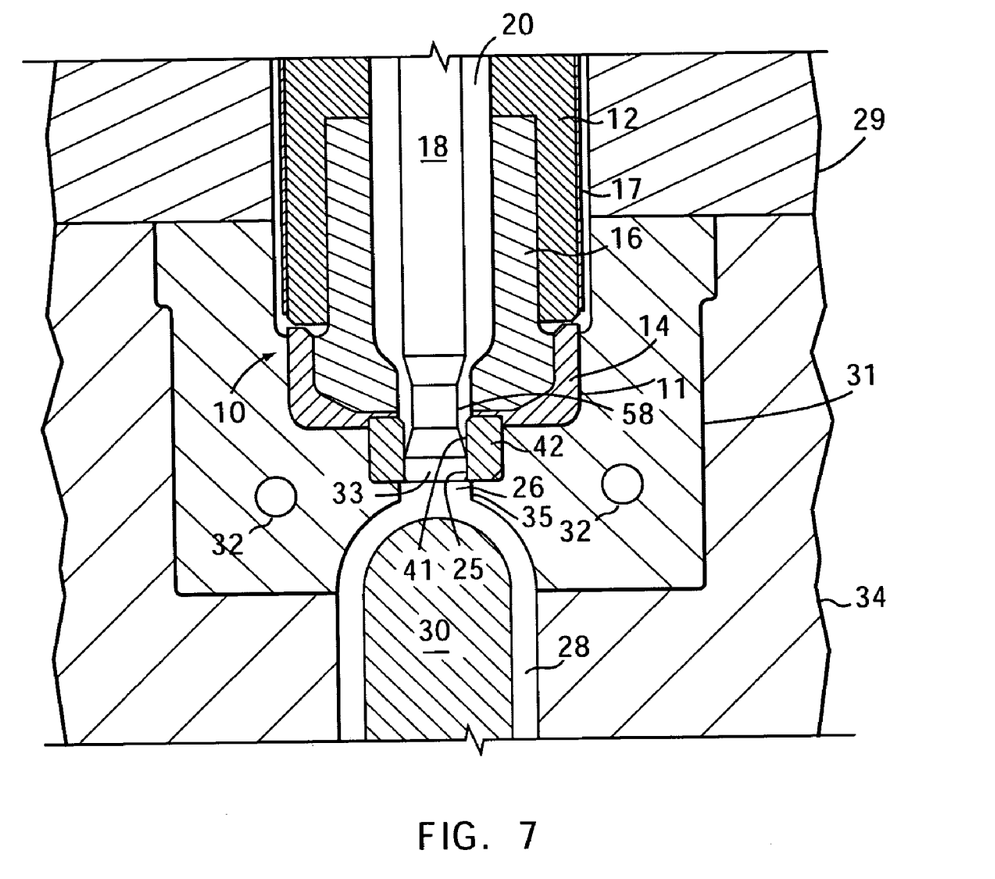
FIG. 7 is the view of FIG. 3 illustrating yet another embodiment of the present invention.

Referring to FIG. 7, in another embodiment of the present invention, replaceable insert 42 is identical to that of the embodiment shown in FIG. 6. Rather than an elongated recess, valve stem 18 has a reduced diameter portion 58 adjacent end portion 33 that allows backflow of the molten material out of bore 41 as the valve stem 18 is brought to a closed position.

Figure 8:
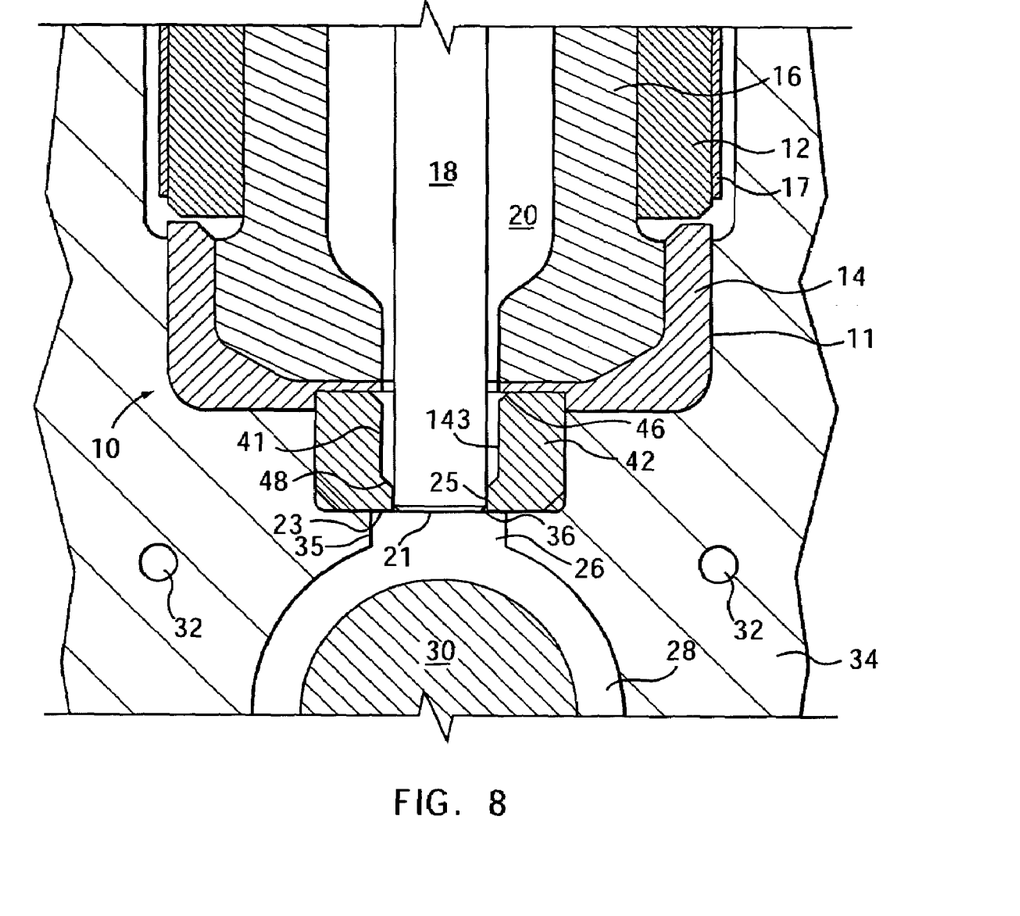
FIG. 8 is a simplified cross-sectional view of another embodiment of the present invention.

Referring to FIG. 8, another embodiment of the present invention uses a conventional valve stem that is a straight cylinder with only a small chamfer 36 at its end. With no additional feature on valve stem 18 to aid the backflow of molten material as the valve stem is brought to a closed position, first portion 143 of bore 41 in replaceable insert 42 is a larger diameter allowing greater clearance between valve stem 18 and bore 41, which provides for backflow of molten material. Sealing portion 25 has a reduced diameter providing a close fit with valve stem 18. Chamfer 46 guides the valve stem 18 into replaceable insert 42, and chamfer 48 guides it into sealing portion 25. This embodiment has the advantage of the simplest configuration of valve stem 18 with a replaceable insert 42 that is readily replaced when wear becomes excessive.

In all of the above embodiments, nozzle assembly 10 contacts the gate insert 31 through an insulator 14 which restricts heat transfer from hot nozzle tip 16 to cold gate insert 31. Insulator 14 also helps align nozzle assembly 10 in gate insert 31. However, molten material can be forced between the insulator and nozzle tip thereby displacing the insulator and affecting alignment of the nozzle assembly 10 with gate insert 31.

Figure 9:
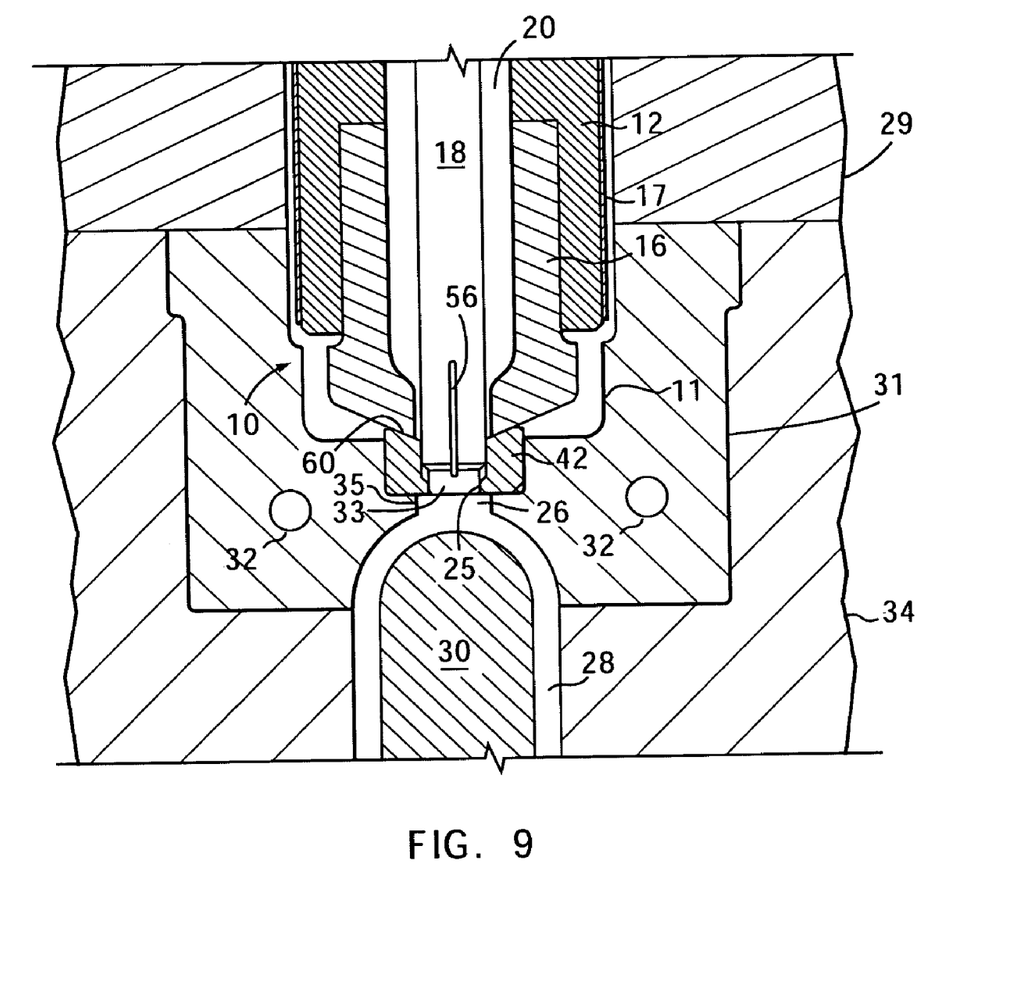
FIG. 9 is the view of FIG. 3 illustrating yet another embodiment of the present invention.

Referring to FIG. 9, another embodiment of the present invention eliminates the need for an insulator between the nozzle tip 16 and the gate insert 31. In this embodiment, replaceable insert 42 is made of a material having low thermal conductivity, such as titanium or ceramic, to reduce heat transfer between the nozzle tip 16 and gate insert 31. Nozzle tip 16 seats directly against the upper surface 60 of the replaceable insert 42. The upper surface 60 preferably has a conical shape over at least a center portion and receives the conical end of nozzle tip 16 to aid in aligning the nozzle tip in gate insert 31.

Figure 10:
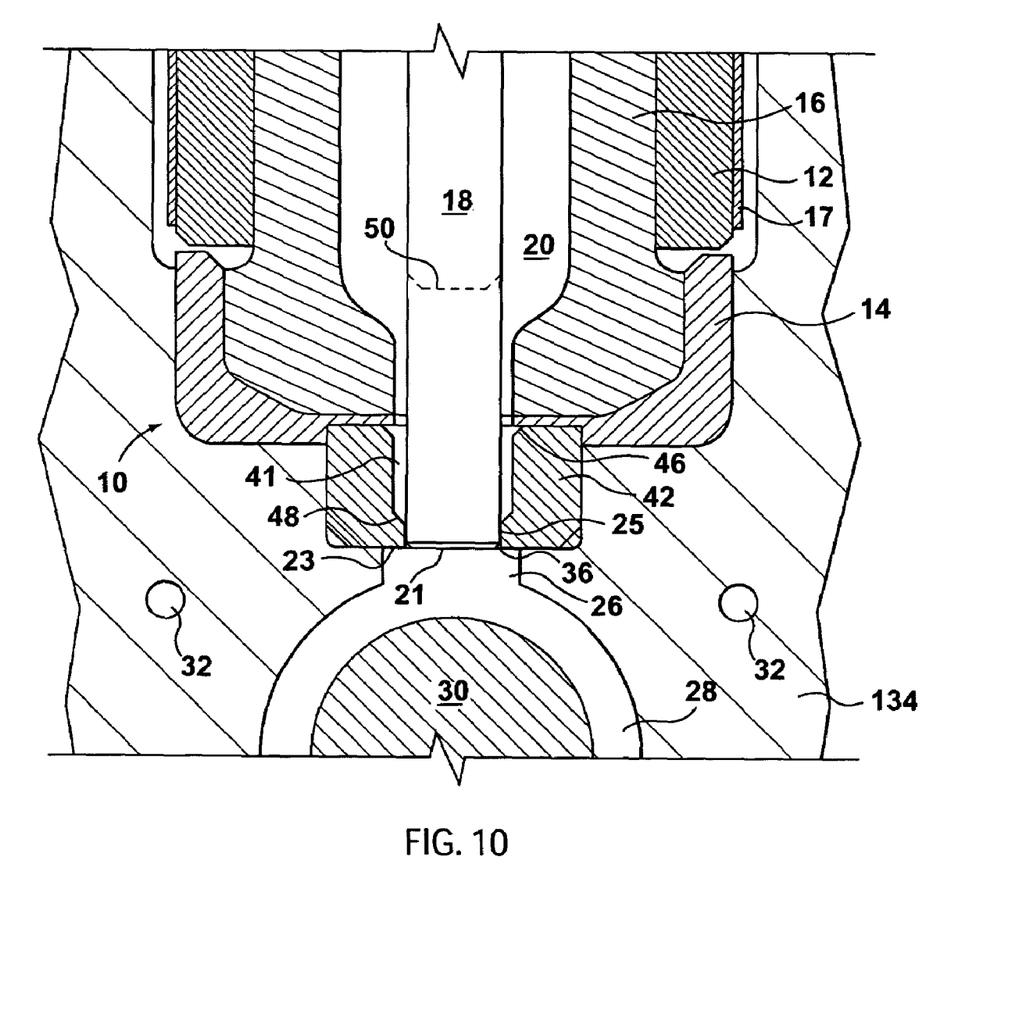
FIG. 10 is a simplified cross-sectional view of another embodiment of the present invention.

Referring to FIG. 10, another embodiment of the present invention is shown wherein the replaceable insert 42 is located in a cavity plate 134. That is, the embodiment is similar to that of FIG. 3 except that the gate structure is formed directly into the cavity plate.

Figure 11:
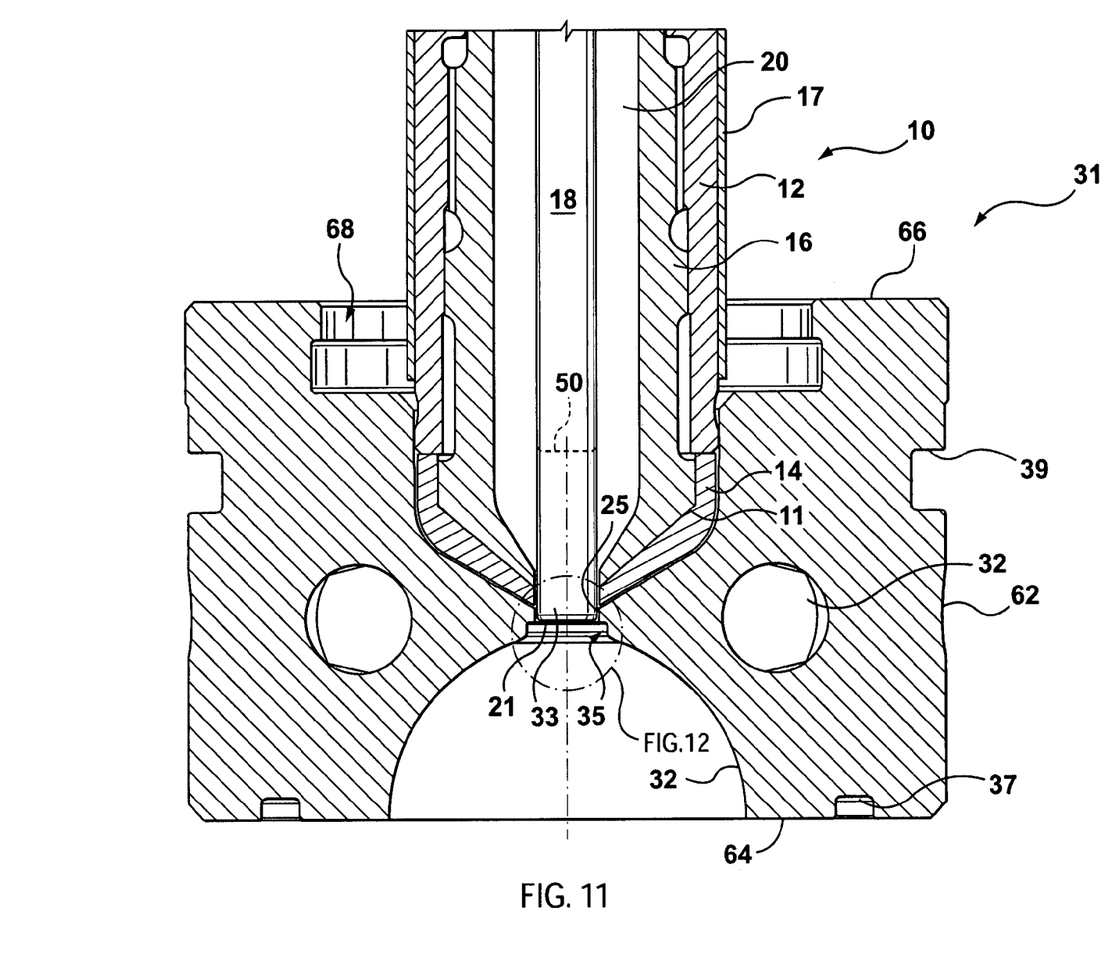
FIG. 11 is a simplified cross-sectional view of a gate insert and nozzle, illustrating the best mode of the present invention.

Referring now to FIG. 11, illustrating the best mode of the present invention, an injection molding nozzle assembly 10 is shown seated within a recess 11 of a gate insert 31 that has been configured in accordance with the present invention. In particular, the gate insert 31 includes a vestige forming portion 35 and a gate sealing portion 25 that have been configured to cooperate, as described in detail hereinafter, for enabling the separation of the vestige 26 (FIG. 5) from the vestige forming portion 35 without any substantial tearing along the side thereof.

The configuration of the nozzle assembly 10 and gate insert 31 are otherwise typical and are generally consistent with the prior art description provided hereinbefore and as shown with reference to FIG. 1A. Accordingly, neither the nozzle assembly 10 or the gate sealing portion 25 have been configured to include any of the supplemental features introduced hereinbefore. In particular, the presently preferred embodiment does not include any separation of the alignment and sealing functions between the valve stem 18 and the gate sealing portion 25 (e.g., an aligning portion adjacent the gate sealing portion), nor is there any additional provision for a melt backflow feature (i.e., adjacent the end portion of the valve stem 18 or adjacent the gate sealing portion 25). Nonetheless, the present invention is considered to be fully compatible therewith.

The gate insert 31 is shown to further include grooves 37 and 39 that are configured for receiving coolant seals, such as an o-rings. The gate insert 31 is also shown to include a pocket 68 that has been configured for ease of removal and installation of the gate insert 31 into a cavity 34 (FIG. 1A) or cavity plate 134 (not shown). In addition, the preferably cylindrical gate insert 31 is also shown to include a top 66, side 62, and bottom 64 surfaces.

Figure 12:
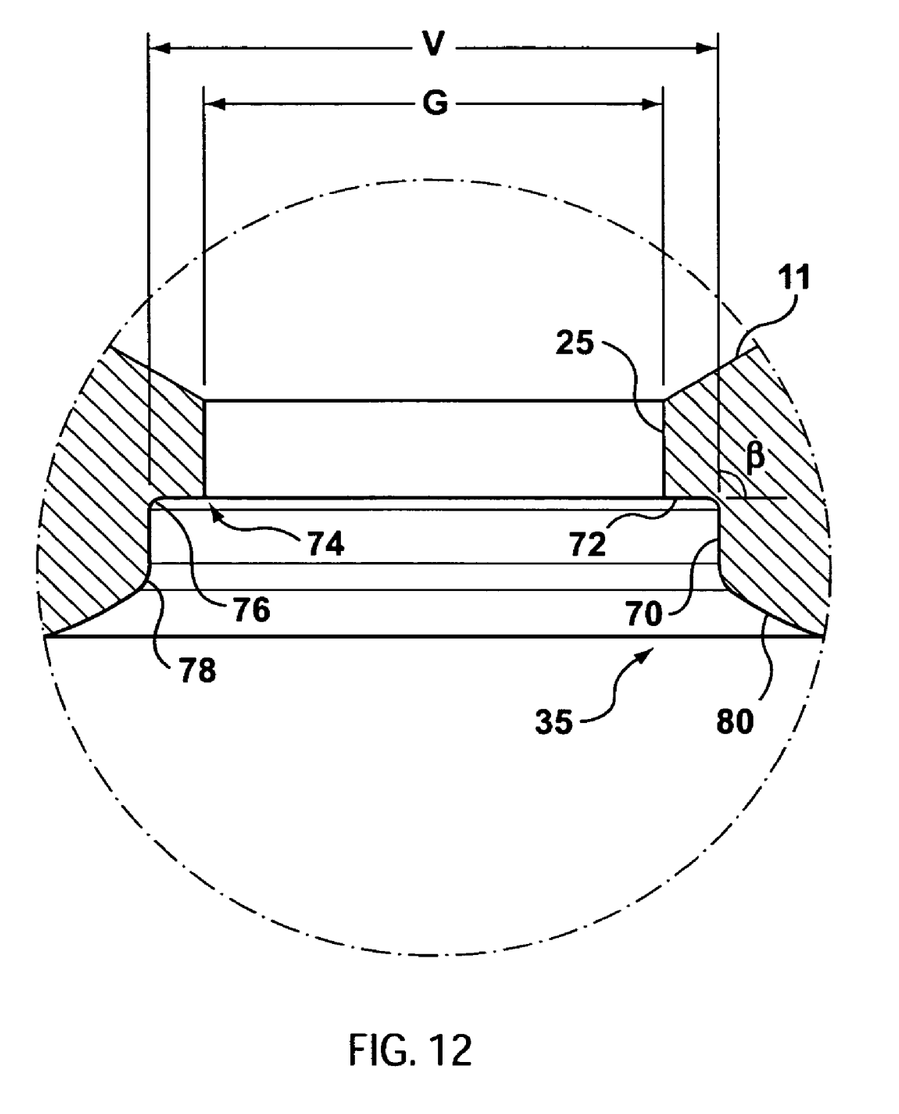
FIG. 12 is an enlarged view of the gate area of the gate insert as indicated in FIG. 11.

Referring to FIG. 12, a gate area of the gate insert 31 is shown that has been configured in accordance with the present invention. In particular, the vestige forming portion 35 has been configured to extend radially outwardly from the sealing portion 25 such that a first cross-sectional area, G, of the sealing portion 25 is smaller than a second cross-sectional area, V, of the vestige forming portion 35 (i.e., a 'stepped-gate'). Accordingly, a vestige 26 is formed in the vestige forming portion 35 that includes an outer circumferential portion 23 (FIG. 5) that is positioned beneath an annular portion 72 of the vestige forming portion 35. The annular portion, as will be described in detail hereinafter, is configured between the gate sealing portion 25 and a side portion 70 of the vestige forming portion 35. As will be explained in detail hereinafter, it is the interaction of the outer circumferential portion 23 and the vestige forming portion 35 that is considered to be important in avoiding gate tearing.

As shown, the gate area of the gate insert 31 preferably comprises a first and a second cylindrical bore that are both concentrically configured through a central portion of the gate insert 31. The first cylindrical bore is configured adjacent the nozzle recess 11, and a inlet end thereof is configured for fluid communication with the nozzle assembly 10. An inner circumferential surface of the first bore provides the gate sealing portion 25 and accordingly has first cross-sectional area, G. The second cylindrical bore is configured directly beneath the first cylindrical bore with a discharge end of the first cylindrical bore in fluid communication therewith. The second cylindrical portion has been configured to provide a portion of the side and top of the vestige forming portion 35. Accordingly, the second cylindrical bore has a cross-sectional area, V, that is wider than that of the first cylindrical bore, as previously introduced.

Accordingly, the vestige forming portion 35 is preferably configured, and shown, to comprise a top, a side, and a transition portion. The top portion comprises the annular portion 72 and the face portion 21 (FIG. 11) of the valve stem 18, when the valve stem is in the closed position. The annular portion 72 is a residual portion of the top of the second cylindrical bore that is adjacent the discharge end of the first cylindrical bore. The side portion 72 comprises the inner circumferential surface of the second cylindrical bore. The vestige forming portion 35 may also include a small radial portion 76 in the corner between the side and top portions of the vestige portion 35. The transition portion is configured to gradually blend the vestige forming portion 35 into the adjacent molding surface portion 32 of the mold cavity 28. Accordingly, the transition portion may include a first and a second outwardly diverging radial portions 78 and 80.

Preferably, the cross-sectional area, V, of the vestige forming portion 35 is configured to be at least 17 percent (%) greater than the cross-sectional area, G, of the gate sealing portion 25. In addition, the radial portion 76 is preferably configured to be minimal. The side portion 70 is preferably configured to be substantially perpendicular to the annular portion 72 (i.e., gate tear is reduced as β approaches 90°). The corner 74 between the annular portion 72 and the gate sealing portion 25 is preferably configured to be sharp. In addition, the bottom portion 21 of the valve stem 18 is preferably flat and coplanar (i.e., flush) with the top surface of the annular portion 72 when the valve stem is in its closed position. The bottom portion 21 could otherwise be slightly forward or behind the annular portion 72, when the valve is in the closed position, and/or have an alternative configuration (e.g., conical, concave, convex, spherical, etc.) without effecting the proper operation of the invention.

The circumferential portion 23 (FIG. 5) of the vestige 26, which is in contact with the cooled annular portion 72, side portion 70, and transition portions 78 and 80 will cool faster than the remainder of vestige 26 since the remainder is in contact with the relatively hot face portion 21 of the valve stem 18. Accordingly, the circumferential portion 23 (FIG. 5) of the vestige 26 is relatively hard which assists in preventing the propagation of any tear therealong. In addition, by virtue of the stepped-gate, the force that is applied to remove molded article 27 from the mold cavity 28 (FIG. 1A), and hence tear the vestige 26 from any molding material that has solidified between the valve stem 18 and the gate sealing portion 25, is no longer tangent to the outside surface of the vestige 26. Accordingly, the outside surface of the vestige 26, and the adjacent outside surface of the molded article 27, is effectively isolated from the force thereby preventing tears from propagating therealong.

The foregoing applies equally to all of the alternative embodiments described hereinbefore as it relates to the configuration of the gate area to substantially avoid gate tear.

It will, of course, be understood that the above description has been given by way of example only and that modifications in detail may be made within the scope of the present invention as defined by the following claims.

What is claimed is:

1. An injection molding apparatus for forming injection molded articles that include a vestige portion on an end thereof, the vestige portion includes a side and a top, said apparatus including:
   a mold with a mold cavity defined therein;
   a valve-gate injection nozzle assembly;
   a connecting passageway configured in the mold between the nozzle assembly and the mold cavity;
   a moveable valve member provided in the nozzle assembly for regulating a flow of molten material through the connecting passageway to the mold cavity;
   a sealing portion configured along at least a forward portion of the connecting passageway, the sealing portion is configured to cooperate, in use, with an end portion of the valve member, in use, when the valve member is configured in a closed position;
   a vestige forming portion configured in the mold, as a portion of the mold cavity, adjacent the connecting passageway;
   the vestige forming portion having a side and a top portion, that correspond to the side and top of the vestige portion respectively; and
   a central portion of the top of the vestige forming portion is provided by a bottom portion of the valve member, in use, when the valve member is arranged in the closed position;
   the vestige forming portion is configured to extend radially outwardly from the sealing portion such that a first cross-sectional area of the sealing portion is smaller than a second cross-sectional area of the vestige forming portion;

wherein, in use, on ejection of the molded article from the molding cavity, tearing along the side of the vestige portion of the molded article is substantially avoided.

2. The apparatus of claim 1, wherein the connecting passageway and the vestige forming portion are configured within a gate insert.

3. The apparatus of claim 1, wherein the connecting passageway and the vestige forming portion are configured in a replaceable insert.

4. The apparatus of claim 3, wherein the replaceable insert is configured for installation in a gate insert.

5. The apparatus of claim 3, wherein the replaceable insert is configured for installation in a cavity plate.

6. The apparatus of claim 1, wherein the connecting passageway further includes an alignment portion that is configured between the nozzle assembly and the sealing portion for aligning the end portion of the valve member with the sealing portion.

7. The apparatus of claim 1, wherein the valve member is configured to include a melt backflow means.

8. The apparatus of claim 7, wherein the melt backflow means is an elongated recess that is formed along a portion of the length of the valve member adjacent the end portion thereof.

9. The apparatus of claim 7, wherein the melt backflow means is a reduced diameter portion that is provided adjacent the end portion of the valve member.

10. The apparatus of claim 1, wherein the connecting passageway is configured to include a melt backflow means.

11. The apparatus of claim 10, wherein the melt backflow means is provided between a first portion of the connecting passageway that is configured to be larger in diameter than the adjacent sealing portion.

12. The apparatus of claim 2, wherein the connecting passageway and the vestige forming portion are provided along a first and a second cylindrical bore, respectively, that are both concentrically configured through a central portion of the gate insert, and that an annular portion is configured therebetween that defines a portion of the top portion of the vestige forming portion.

13. The apparatus of claim 3, wherein the connecting passageway and the vestige forming portion are provided along a first and a second cylindrical bore, respectively, that are both concentrically configured through a central portion of the replaceable insert, and that an annular portion is configured therebetween that defines a portion of the top portion of the vestige forming portion.

14. The apparatus of claims 12 or 13, wherein the cross-sectional area of the vestige forming portion is configured to be at least 17 percent (%) greater than the cross-sectional area of the sealing portion.

15. The apparatus of claim 14, wherein the top and side portions of the vestige forming portion are substantially perpendicular.

16. The apparatus of claim 14, wherein the bottom portion of the valve member is flat and coplanar with the annular portion of the vestige forming portion when the valve member is in the closed position.

17. The apparatus of claim 14, wherein the bottom portion of the valve member is further forward than the annular portion of the vestige forming portion when the valve member is in the closed position.

18. The apparatus of claim 14, wherein a minimal radial portion is configured in a corner between the side and top portions of the vestige portion.

19. The apparatus of claim 14, wherein a corner between the annular portion and the sealing portion is configured to be substantially sharp.

20. The apparatus of claim 14, wherein the vestige forming portion further includes a transition portion that is configured to gradually blend the vestige forming portion into the remainder of the molding cavity.

21. A gate insert that is configured to cooperate with at least one other molding insert in an injection mold for forming injection molded articles that include a vestige portion on an end thereof, the vestige portion includes a side and a top, the gate insert including:
    a gate insert body;
    a nozzle seat for receiving a valve-gate injection nozzle assembly that is configured along the surface of a recess formed through a top surface of the gate insert body;
    a molding cavity portion that is configured along the surface of an opening formed through a bottom surface of the gate insert body;
    a connecting passageway configured between the nozzle seat and the molding cavity portion;
    a sealing portion configured along at least a forward portion of the connecting passageway, the sealing portion is configured to cooperate, in use, with an end portion of a valve member of the nozzle assembly, in use, when the valve member is configured in a closed position;
    a vestige forming portion configured in the gate insert body between the connecting passageway and the molding cavity portion;
    the vestige forming portion having a side and a top portion, that correspond to the side and top of the vestige portion respectively; and
    a central portion of the top of the vestige forming portion is provided, in use, by a bottom portion of the valve member in the closed position;
    the vestige forming portion is configured to extend radially outwardly from the sealing portion such that a first cross-sectional area of the sealing portion is smaller than a second cross-sectional area of the vestige forming portion;
    wherein, in use, on ejection of the molded article from the molding cavity, tearing along the side of the vestige portion of the molded article is substantially avoided.

22. The gate insert of claim 21, wherein the connecting passageway further includes an alignment portion that is configured along a rear portion thereof for aligning the end portion of the valve member with the sealing portion.

23. The gate insert of claim 21, wherein the connecting passageway is configured to include a melt backflow means.

24. The gate insert of claim 23, wherein the melt backflow means is provided between a first portion of the connecting passageway that is configured to be larger in diameter than the adjacent sealing portion.

25. The gate insert of claim 21, wherein the connecting passageway and the vestige forming portion are provided along a first and a second cylindrical bore, respectively, that are both concentrically configured through a central portion of the gate insert, and that an annular portion is configured therebetween that defines a portion of the top portion of the vestige forming portion.

26. The gate insert of claim 21, wherein the connecting passageway and the vestige forming portion are provided along a first and a second cylindrical bore, respectively, that are both concentrically configured through a central portion of the replaceable insert, and that an annular portion is configured therebetween that defines a portion of the top portion of the vestige forming portion.

27. The gate insert of claim 26, wherein the cross-sectional area of the vestige forming portion is configured to be at least 17 percent (%) greater than the cross-sectional area of the sealing portion.

28. The gate insert of claim 26, wherein the top and side portions of the vestige forming portion are substantially perpendicular.

29. The gate insert of claim 26, wherein the bottom portion of the valve member is coplanar with the annular portion of the vestige forming portion when the valve member is in the closed position.

30. The gate insert of claim 26, wherein a minimal radial portion is configured in a corner between the side and top portions of the vestige portion.

31. The gate insert of claim 26, wherein a corner between the annular portion and the sealing portion is configured to be substantially sharp.

32. The gate insert of claim 26, wherein the vestige forming portion further includes a transition portion that is configured to gradually blend the vestige forming portion into the remainder of the molding cavity.

* * * * *